Patented Oct. 6, 1936

2,056,458

UNITED STATES PATENT OFFICE 2,056,458

POTENTIAL RESINS AND PROCESSES OF MAKING THE SAME

Arthur M. Howald, Toledo, Ohio, assignor, by mesne assignments, to Plaskon Company, Incorporated, a corporation of Delaware No Drawing. Application March 7, 1932, Serial No. 597,425. Renewed August 21, 1936. In Great Britain April 8, 1931

13 Claims. (Cl. 260—3)

This invention relates to potential resins and processes of making the same; and it comprises a thin and mobile aqueous solution of the reaction products of formaldehyde and urea in about the molecular proportion 1.5:1, said solution being relatively stable, readily losing water by evaporation to form a white, colorless, water-soluble formaldehyde-free residue softening between 50° and 100° C. and, on longer heating, giving a colorless, infusible, insoluble resin; and it further comprises said dry residue; and it comprises a process of making said solution and said residue wherein commercial, somewhat acid formaldehyde solution is neutralized to give an acidity between pH 4 and pH 6.5, urea is dissolved in the liquid, the amount of urea being about 4 parts by weight for 3 parts by weight of actual formaldehyde, and the solution is allowed to undergo reaction until analysis shows nearly, but not quite, all the formaldehyde has entered into combination, action being then arrested by drying; this drying being either that incident to the use of the liquid or to producing the dried residue as a marketable material; all as more fully hereinafter set forth and as claimed.

In the present invention formaldehyde and urea are utilized to produce what may be termed potential resins; materials which are not themselves resinous but which may be readily resinified; which are, so to speak, "intermediates" in resin making. The primary product is a certain thin and mobile aqueous solution which, when made from commercial 37 per cent formaldehyde solution and solid urea in a way hereinafter set forth, carries about 50 per cent water. It is less viscous than a cane sugar solution of similar concentration.

A white water-soluble non-resinous solid material can be recovered from this primary product by drying or evaporation. Spray drying is convenient. This solid material is probably a complex mixture of substances. It has no definite melting point though it becomes temporarily fluent or pasty when heated. The point at which this fluent condition or semi-fusion occurs may be anywhere between 50° and 80° or 100° C.; it depends on the speed of heating, the amount of polymerization in desiccation, the presence or absence of traces of moisture, the pH value, etc. It always occurs at some temperature and is often between 70° and 80° C. No definite fusion to a thin liquid occurs in well dried material. When in the pasty condition, with a continuance of heating the material resinifies. It sets to a hard, infusible insoluble resin; the hardness progressively increasing to a glass-hard condition. The time required to complete this setting or curing to maximum hardness depends on the temperature and the pH value. In molding shaped articles pressure is useful mainly to obliterate voids and secure a continuum. The use of pressure and compression may be only temporary; hardening being secured by a subsequent baking at temperatures around 80°–100° C. Curing can be at higher temperatures, up to perhaps 135°–140° C., but they are not necessary. Short exposure to heat of the order of 160° C. does not damage the hardened resins. With articles submitted to sufficient compression in the fluent condition to obliterate pores and voids, it is often a convenient expedient to cure in a bath of hot high boiling oil—a heavy lubricating oil. Setting to a glassy solid is due to internal rearrangement or polymerization, and is not attended with evolution of vapors or gases, so that closed molds are not required if the material is properly dried. Formaldehyde is not given off.

Properly hardened articles from properly made material are high grade; they stand immersion in boiling water for 30 minutes as an accelerated test. If no filler is present they are like glass in most properties with the additional advantage of machinability. Good lathe stock can be made by warming spray dried material to a plastic temperature, compressing sufficiently to obliterate voids and then baking at 80° to 100° C. Beads, buttons, handles, etc., can be made from this stock on a lathe. Where transparency is not wanted, the lathe stock can contain a white or colored filler; wood flour for example. Turned articles do not smell of formaldehyde. Properly made and hardened resin is white and colorless unless dyed, is permanent in the air, does not take up moisture and is resistant to actinic light. It is transparent to the ultra violet rays and, though this fact is useful in some relations, it renders care necessary in selecting resistant dyes for colored materials. Mineral pigments can be used.

In making the described primary product a number of conditions are to be observed. The ratio of actual formaldehyde ($COH_2$) to urea by weight should not vary much on either side of 3:4; or, in molecules, from 1.5:1. Any substantial departure from this ratio gives final hard resins deficient in stability. A range between 1.5:1 and 1.6:1 is the best range. There is a small variance possible; but not much. With proper operation there is not much loss of formaldehyde as gas; and it is often unnecessary to add any excess in the initial mix to take care of losses. Commercial formaldehyde solution and commercial urea are used, the latter being dissolved in the former. The mixture is usually filtered.

To secure smooth action, and a thin, mobile, stable unpolymerized primary product, the acidity of the formaldehyde solution should be limited; not greater than about 4 pH. The limiting acidity is not exactly a fixed factor; but with acidities greater than 4 pH correlation of other conditions becomes complicated. Somewhere between 4 and 6.5 pH is the usual working range; the particular pH used depending on the specific results desired. As commercial formaldehyde is always more acid than this, it should be partially neutralized before use; sufficient base being added to give the pH desired. Triethanolamin is a convenient base; but in the small amount required soda, potash, lime, do no harm and can be used. The addition should not be sufficient to make the liquid neutral or alkaline as this favors the production of dimethylol urea; a substance whose formation is here avoided. The reactions taking place in alkaline media are entirely different from those occurring in the presence of free acid; and it is the acid-medium type of reaction which is here wanted. The idea in the present invention is to use acid as a catalyst but not use enough or temperatures high enough to cause violent actions. With any acidity more than corresponds to 4 pH, artificial cooling is necessary in the first stages of action. With 4 pH to 6.5 pH the actions are regular and in the desired direction.

The temperature is an important factor; and particularly in the first stages where the two reactants have their maximum concentration; its importance increasing with the acidity. On dissolving urea in formaldehyde the first action is a physical cooling which, in big batches, may take the temperature down to 0° C. It is then better to warm to 20–25° C. and it is convenient to keep the reaction mixture within that range until the primary product is ready for use; a period which with 4 pH is generally 4 to 5 hours while with 6.5 pH from 10 to 15 hours may be required. Generally I do not operate at any time at a temperature above 30° although with the limited acidity used the objection to higher temperatures is mostly that action goes on too fast for convenience. In a general way, 10 minutes action at 100° C. may carry the reaction as far as 8 hours or so at 25° C. with a 6.5 pH.

In forming the primary liquid product there are apparently two successive types of action which, with proper control of conditions do not overlap materially. There is first a combination or condensation of the urea and formaldehyde to form simple molecules of some kind. Probably this action is complex and a variety of products occur, but that simple unpolymerized molecules are first produced is shown by the low viscosity of the solution. Definite crystallizable compounds have not been isolated from the liquid in this stage. Later, polymerization sets in with attendant rise in viscosity; but in a liquid with a pH of 5 to 6.5 and a temperature of 25° C. this is a slow action. Overlapping this polymerization action is a later tendency to separate crystals; possibly of dimethylol urea. This is to be avoided; partly because dimethylol urea cannot be resinified without separation of formaldehyde and partly because it abstracts formaldehyde from a carefully balanced system; its molecular ratio being 2:1.

In practice I always arrest actions by drying, that is, by removal of water, prior to appearance of crystals; and mostly before development of any substantial increase in viscosity; that is, before there is much polymerization. In the liquid at this time, probably all the formaldehyde is combined with all the urea using the proportions, pH values and temperatures stated; but a minor part of it is more loosely combined than the rest. Generally I arrest internal actions by using the liquid or by drying it to make the described white solid, when a portion removed and added to a solution of sodium sulfite neutral to thymol blue develops a little alkali due to the action of formaldehyde. Whether the fomaldehyde causing this action is actually free or is merely loosely combined, it is impossible to say. The alkali may be titrated. I consider the action has gone far enough and the liquid is ready to use when a fifth or sixth of the formaldehyde still remains free or loosely combined.

The liquid can be dried in any convenient way, being readily handled by ordinary types of evaporators and driers. Vacuum evaporators and vacuum driers can be used. Vacuum drum drying and spray drying are both convenient. In drying the permissible temperature of the material in making a water soluble product varies with the speed of desiccation. With rapid drying, the temperature of the material may go as high as 80° C. with production of dry material still water soluble; but with slow drying lower temperatures are advisable. Where the liquid is taken up by capillaries or by an absorbent filler to expose a large area for evaporation, drying by a current of hot air is convenient. Up to the time of complete desiccation slow reaction is still going on. The particular pH of the liquid affects the results. As stated in my prior application Serial No. 494,693, it is advantageous to slightly raise the acidity to say pH 5 or even pH 4 just prior to drying. That is, the pH during drying is slightly greater than that prevailing during the initial reaction.

In drying, there is little loss of formaldehyde and the loosely bound formaldehyde is fixed. The dried powder and aqueous solutions made from it develop either slight or no reaction for formaldehyde when tested with neutral sodium sulfite.

Solutions made from the powder are like the original solution save in the absence of a formaldehyde test and in having a somewhat greater viscosity. They polymerize more slowly, acidity being the same, and show less tendency to the development of crystals. In other words, their stability is somewhat greater.

The original thin and mobile liquid and the similar reconstituted liquid made by redissolving the dried material have properties enabling their use in a wide variety of arts, varnishing, painting, water-proofing, wood and paper impregnating, etc. The liquid will carry large proportions of the clays and other finely divided mineral matters used in glazing paper, giving a mix capable of application by the usual brushing and spraying mechanisms used in making coated paper. The liquid is useful in making cold water paints; and the dried, fine ground material can be mixed with dry pigments to make a preparation forming a "cold water paint" on addition of water. In all these uses, as the water of the liquid evaporates, there is a formation of the dry product mentioned. In time, this will resinify and quick resinification can be induced by application of heat, as in passing coated or impregnated paper or fabric over hot rolls. In so doing the liquid first dries, and residue becomes fluent and plastic and is then converted into the glassy type of resin described "Cellophane" may be waterproofed in this manner.

The primary liquid and the reconstituted liquid can be usefully employed in making molding powders, being taken up by wood flour and other filler and dried in place. They can also be used for impregnating thick paper and pulp board to be used in hot stamping processes. These particular uses, however, I do not herein claim, they forming the subject matter of prior and copending applications, Nos. 578,744 and 583,154.

One of the most important uses of the dry material mentioned is in making the described reconstructed thin and mobile liquor. The dry material can be packaged and stored and the reconstituted liquor made as wanted and in any convenient amount, it being merely necessary to add the desired amount of water at the ordinary temperature. But the dry material has many other uses. It may be made into glassy molded articles in the way described. It is a convenient material from which to make lathe stock for turning purposes. In making inch bar stock, a dry material plasticizing at, say, 70° C. is placed in an inch steel mold at 70° C. and submitted to a sufficient pressure to obliterate the voids. No high pressure is needed. The bar stock is then removed from the mold and baked at from 80° to 100° C. for as long a period as may be needed. Sometimes, to secure full curing, a day's heating at 80° C. may be necessary. It depends upon the pH of the material. With a pH of 4 or 5 curing is quicker than with a pH of 6 or 6.5. In a general way, the more acid the material, the quicker is the cure. As stated in my prior copending application Serial No. 494,693, these potential resins can be hot pressed at 140° C. under pressure of about one ton per square inch whereby they become resinified, without substantial evolution of volatiles.

In making glazing and coating compositions for paper, other binders, casein, glue, etc., for example, may be admixed with the materials made under the present invention. Casein and glue solutions can be made compatible with the primary liquor or the reconstituted liquor of the present invention. Fillers not disturbing the pH are best.

The unresinified material can be dissolved in various non-aqueous solvents. Methyl cellosolve (monomethyl ether of ethylene glycol) and the corresponding ethyl compound, can be used as solvents. Cellulose nitrate, etc. can be dissolved in these solutions and compound lacquers and coating materials made.

The partially resinified material may be blended with other resins in making compound coatings.

The stated ratio of 1.5:1 is the best for making hard, glassy resins of the highest stability; it is the best in making lathe stock and molded articles. Very little variance is possible. But the liquid products made under the present invention are susceptible of use in very many relations; and for these purposes it is sometimes desirable to vary from the stated 1.5:1 ratio, the range being, perhaps, between 1.05:1 and 1.55:1. These ratios give liquid reaction mixtures under the conditions disclosed ante which can be dried to give water soluble products from which solutions can be reconstituted on the addition of water; these solutions being useful for many purposes. Ratios between 1.05:1 and 1.55:1 are disclosed in my prior application, Serial No. 494,693, of which the present application is a continuation in part. In these various uses I may employ the various specific conditions and methods of control disclosed in the acknowledged application. Good and useful products capable of various uses may be made in various ways so long as the reaction of formaldehyde and urea is controlled in such manner that arrested reaction products can be formed which in a dry state are soluble in water. Higher ratios of formaldehyde than 1.55:1 are not desirable, this amount of formaldehyde taking care of all probable losses in manufacture. Higher formaldehyde ratios cause a tendency to produce dimethylol urea and give trouble by evolution of formaldehyde vapor in heating steps.

Various alkyl and aryl substituted ureas may be used in lieu of ordinary urea, the reaction being controlled by limiting the acidity and the temperature, one or both, in the way specified. The products are good, but as the matter is at present regarded, products made with urea itself are more advantageous.

Reaction between urea and formaldehyde is always effected in aqueous solution and it is necessary to remove the water subsequently. In practically all processes of the prior art, the products are gummy or gelled, rendering removal of water difficult. Where an excess of formaldehyde is used, as it generally is, this must also be removed. In the present process the primary reaction products are not resinous, are not gummy and are not gelled so that removal of water is readily effected. And there is no excess formaldehyde to be disposed of. In a way, while I am making formaldehyde-urea resins, I am postponing resinification until after the water is removed from the system.

What I claim is:—

1. In the manufacture of plastic and liquid compositions, the process which comprises mixing together formaldehyde and urea in acid solution, the molecular proportion of formaldehyde to urea being between 1.05:1 and 1.55:1, the acidity of said mixture being between 5 and 6 pH, maintaining the said mixture having said acidity at a relatively low temperature until most of the formaldehyde has become fixedly combined and not more than one-fifth thereof remains as loosely combined formaldehyde detectable by test with sodium sulphite, the temperature and acidity being insufficient to produce resinification or a substantial amount of condensation, and then arresting the reaction by evaporating the slightly acid solution of reaction products so obtained at a low temperature until a dry solid condensation product, substantially free of formaldehyde and other uncombined volatiles is obtained, the temperature and acidity being insufficient to cause any substantial resinification but sufficient to remove substantially all volatiles uncombined or loosely combined with the condensation product, the arrested, slightly acid, low temperature, acid condensed, reaction product of formaldehyde and urea thus obtained being a potential resin soluble in water, fusible and capable of heat-hardening without liberation of volatiles and without alteration in the ratio of combined formaldehyde and combined urea.

2. In the preparation of potential resins from formaldehyde and urea, the process which comprises partially neutralizing a commercial formaldehyde solution to give a pH between 4 and 6.5, adding sufficient urea to give a molecular ratio of formaldehyde to urea of about 1.5:1, allowing the reaction to go forward until not more than one-fifth or one-sixth of the formaldehye can be detected by a sulfite test, the temperature and acidity being insufficient to form a substantial amount of condensation product arresting the reaction by drying the solution until a dry soluble solid is obtained, the temperature and acidity during drying being insufficient to effect resinification but being sufficient to effect removal of all volatiles and reconstituting the liquid by addition of water to the dry residue, to obtain a slightly acid aqueous solution of potential resin which when first made contains no free formaldehyde.

3. In the preparation of liquid and pasty materials for glazing paper, coating "Cellophane", making varnishes, cold water paints, and other uses, the process which comprises partially neutralizing a commercial formaldehyde solution, dissolving urea in the solution to give a ratio between 1.04:1 and 1.55:1 of formaldehyde to urea, allowing reaction to go forward spontaneously, arresting reaction before crystallization or insoluble bodies develop by desiccation at a temperature and acidity sufficient to remove volatiles but insufficient to cause substantial resinification and subsequently forming the said liquid or pasty composition from the dried residue by the addition of water, the necessary amount of water being added at this time.

4. As an improved formaldehyde-urea condensation product, a potential resin having formaldehyde and urea residues combined in the approximate ratio of 1.5:1, said potential resin being a dry, arrested, slightly acid low-temperature, acid condensed reaction product of formaldehyde and urea in said ratio, formed in a slightly acid aqueous solution and being soluble, fusible and substantially free of volatiles, said potential resin being further capable of heat-hardening without substantial liberation of volatiles to give stable, hard, insoluble, infusible masses and of dissolving in water to give thin, mobile liquids having a high concentration of said potential resin and capable of entering capillaries.

5. As a new and improved potential resin suitable for production of molded articles and of liquid coating compositions, said potential resin comprising arrested, low temperature, acid-condensed reaction products of formaldehyde and urea in approximately molecular proportions ranging between 1.05:1 and 1.55:1, said potential resin being a white, colorless, dry, non-resinous, water-soluble solid, substantially free of uncombined volatiles, softening when heated, to a plastic condition without liquefying, and being capable of heat-hardening to resinous infusible insoluble bodies by internal rearrangement and polymerization without liberation of volatiles and without alteration in the ratio of combined formaldehyde to combined urea, the heat-hardened products being stable and having a superior resistance to water and moisture.

6. The potential resin of claim 5 wherein said dry solid is capable of dissolving in water to give thinly mobile clear solutions capable of penetrating capillaries even when carrying a high concentration of dissolved potential resin, said solutions when freshly made containing substantially no free formaldehyde detectable by test with a sodium sulphite solution neutral to thymol blue.

7. The potential resin of claim 5 wherein the dry potential resin contains not more than 2 per cent physical moisture, is capable of softening without liquefying at temperatures between 50 and 80° C., is capable of heat hardening at temperatures between 80 and 100° C. and of rapidly hardening at temperatures above 100° C. after first softening, and which is capable of being quickly shaped and heat-hardened by hot pressing at temperatures between 130 and 140° C. under a pressure of approximately one ton per square inch without the evolution of vapors and gases, to give pressure-shaped, heat-hardened products capable of withstanding the action of boiling water for at least 30 minutes.

8. An arrested, slightly acid reaction product of formaldehyde and urea containing formaldehyde and urea residues fixedly combined in the ratio of approximately 1.5:1, said products being dry, white, colorless, non-resinous, water-soluble solid bodies which soften without liquefying when moderately heated and which directly polymerize upon further heating to form stable, insoluble, infusible resinous bodies, said dry solid bodies being free of formaldehyde and other uncombined volatiles and dissolving in water to give slightly acid, thinly mobile solutions which, when first made, contain no free formaldehyde.

9. The arrested product of claim 8 wherein said dry slightly acid solid bodies are potential resins capable of being dissolved in a solution of sodium sulphite neutral to thymol blue without liberating free alkali determinable by titration with acid, thus showing the absence of free formaldehyde, and which are capable when dissolved in about an equal amount of water of giving a thinly mobile solution which will enter capillaries and which has a pH of between 4 and 6.

10. The arrested reaction product of claim 8 wherein the said dry slightly acid solid bodies are potential resins which are plastic at temperatures between 50° and 100° C. and which above 100° C. heat-harden to give resinous, insoluble, infusible bodies, the heat-hardening being rapid under heat and pressure at acidities corresponding to a pH between 5 and 4 and temperatures of between 130 and 140° C. to give the pressure-shaped, heat-set molded bodies withstanding boiling water for at least 30 minutes without deterioration, the dry potential resin being capable of heat-hardening without liberation of formaldehyde and other vapors and without alteration in ratios of combined formaldehyde to combined urea.

11. The process of claim 1 wherein the molecular ratio of formaldehyde to urea is approximately 1.5:1, the formaldehyde and urea being reacted at room temperature in an aqueous solution having an acidity of about 6 pH.

12. The process of claim 1 wherein the said ratio of formaldehyde to urea is 1.5:1 and the dried solid product containing not more than 2 per cent physical moisture is subsequently moderately heated until it becomes plastic, the warm plastic material is compacted by pressure sufficient to obliterate voids and the so compacted material is baked until a hard, infusible, insoluble body is obtained.

13. The process of claim 3 wherein the solution of urea in aqueous formaldehyde in said ratios having a pH between 4 and 6.5 is maintained at temperatures between 20 and 30° C. for approximately 10 hours, and then, the drying is effected at an acidity equivalent to 4 to 5 pH at temperatures between 30 and 80° C.

ARTHUR M. HOWALD.